United States Patent
Huang et al.

(10) Patent No.: US 7,218,331 B2
(45) Date of Patent: May 15, 2007

(54) BOUNDING BOX IN 3D GRAPHICS

(75) Inventors: Hsilin Huang, Milpitas, CA (US); Peng Yu, San Jose, CA (US); Peifeng Wu, Sunnyvale, CA (US)

(73) Assignee: VIA Technologies, Inc., Hsin-Tien Taipei (TW)

( * ) Notice: Subject to any disclaimer, the term of this patent is extended or adjusted under 35 U.S.C. 154(b) by 0 days.

(21) Appl. No.: 10/436,712

(22) Filed: May 13, 2003

(65) Prior Publication Data

US 2004/0227772 A1 Nov. 18, 2004

(51) Int. Cl.
*G09G 5/00* (2006.01)
*G06T 15/30* (2006.01)

(52) U.S. Cl. .................................................. 345/622
(58) Field of Classification Search .................. 345/620, 345/621, 622, 623, 624
See application file for complete search history.

(56) References Cited

U.S. PATENT DOCUMENTS

| | | | | |
|---|---|---|---|---|
| 5,012,433 | A * | 4/1991 | Callahan et al. | 345/623 |
| 6,603,474 | B1 * | 8/2003 | Cobb et al. | 345/421 |
| 6,686,924 | B1 * | 2/2004 | Mang et al. | 345/620 |
| 6,717,576 | B1 * | 4/2004 | Duluk et al. | 345/419 |
| 6,771,264 | B1 * | 8/2004 | Duluk et al. | 345/426 |
| 2001/0005209 | A1 * | 6/2001 | Lindholm et al. | 345/506 |

OTHER PUBLICATIONS

Eric Lengyel, "The Mechanics of Robust Stencil Shadows" Oct. 11, 2002, Gamasutra, http://www.gamasutra.com/features/20021011/lengyel_01.htm.*
Morgan McGuire, John F. Hughes, and Kevin T. Egan all three of Brown University and Mark J. Kilgard and Cass Everitt both of NVIDIA Corporation, Nov. 6, 2003, Fast, Practical and Robust Shadows, pp. 1-25.*

* cited by examiner

*Primary Examiner*—Jeffrey A. Brier
(74) *Attorney, Agent, or Firm*—Thomas, Kayden, Horstemeyer & Risley

(57) ABSTRACT

A system and method for processing a graphics primitive for display in a display area defined by a scissoring window. The graphics primitive is part of an object in view space which also includes a near and a far plane and possibly one or more user-defined clipping planes. These planes may affect the portion of the graphics primitive to be rendered in the display area. The graphics primitive is enclosed by a bounding box, which is then reduced, if possible, based on the Znear clipping plane intersecting the graphics primitive. The reduced bounding box is then subjected to the scissoring window if a portion of the bounding box lies outside the window. The final bounding box determines how much of the graphics primitive should be rendered in the display area. This reduces the amount of rendering that is required of the graphics system, and increases the performance of the system.

10 Claims, 10 Drawing Sheets

BOUNDING BOX IN 3D GRAPHICS

FIELD OF THE INVENTION

The present invention relates generally to a more efficient way of determining whether or not to render a graphics primitive, and more particularly to the use of a bounding box enclosing a graphics primitive to determine whether the primitive should be rendered based on the bounding box.

DESCRIPTION OF THE RELATED ART

In a 3D graphics pipeline there are several coordinate spaces through which an object passes to finally become rendered in the display space. These are the local coordinate space of the object, the world coordinate space ($x_w$, $y_w$, $z_w$) of the scene in which objects are included, a view space, with coordinates ($x_v$, $y_v$, $z_v$), which defines a point of view of the scene, a 3D screen space, with coordinates ($x_s$, $y_s$, $z_s$) in which projection transformations are performed to prepare the objects for display, and a 2D display space for actually displaying the objects on a screen. In 3D screen space, the projection transformation includes two steps. In the first step, a perspective transformation occurs from the view space ($x_v$, $y_v$, $z_v$) to a homogeneous 4D space (X, Y, Z, w). In the second step, a perspective divide (by w) occurs, causing a move from the homogeneous 4D space (X, Y, Z, w) to the 3D screen space ($x_s$, $y_s$, $z_s$).

In the view space, it is common to consider a view volume having a near plane, a far plane and four side surfaces connecting the two planes. Additionally, a display plane is commonly positioned between the near and far planes and any number of user-defined clip planes are permitted in the view space. The six-sided view frustum and the user-defined clipping planes are used for determining whether an object will be visible in the rendered image. If primitives, such as triangles and lines, are used to construct an object, then whether the primitives will be visible in the rendered image must be determined. Generally, it is very difficult to know the exact area of the primitive that should be rendered, especially when user-defined clipping planes are involved. A simple and fast way of determining whether a graphics primitive should be rendered is desired.

BRIEF SUMMARY OF THE INVENTION

A method in accordance with the present invention includes a method for processing a graphics primitive for display in a display space defined by a scissor window, where the graphics primitive is part of an object in a view space including a clipping plane that has an included and excluded side. The method includes forming an initial bounding box in the display space for the graphics primitive, where the display space includes an edge derived from the clipping plane in the view space and the initial bounding box includes only those vertices on the included side of the clipping plane. The method further includes, if the clipping plane intersects the graphics primitive, adjusting the bounding box to include the intersection point, and if the adjusted bounding box falls partially outside of the scissor window, modifying the adjusted bounding box based on the edges of a scissor window, and then rendering the portion of the graphics primitive within the modified bounding box.

An apparatus in accordance with the present invention includes an apparatus for processing a graphics primitive for display in a display space defined by a scissor window, where the graphics primitive is part of an object in a view space including a clipping plane having an included and excluded side and has an initial bounding box in the display space. The apparatus includes x-clipping logic, y-clipping logic, x-scissors window logic, and y-scissors window logic. The x-clipping logic has inputs for receiving the left and right x-coordinates of the initial bounding box and is configured to adjust the x-coordinates of the initial bounding box for the graphics primitive. The y-clipping logic has inputs for receiving the top and bottom y-coordinates of the initial bounding box, and is configured to adjust the y-coordinates of the initial bounding box for the graphics primitive. The x-window scissor logic is coupled to the x-clipping logic to receive the adjusted x-coordinates of the bounding box and is configured to modify the x-coordinates of the adjusted bounding box. The y-window scissor logic is coupled to the y-clipping logic to receive the adjusted y-coordinates of the bounding box, and is configured to modify the y-coordinates of the adjusted bounding box.

One advantage of the present invention is that the bounding box reduces the draw area of the graphics primitive.

Another advantage is that the use of a bounding box helps discard the primitive in an early stage.

Yet another advantage is that use of the bounding box reduces the risk of a low quality image when there is loss of precision in the calculations.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
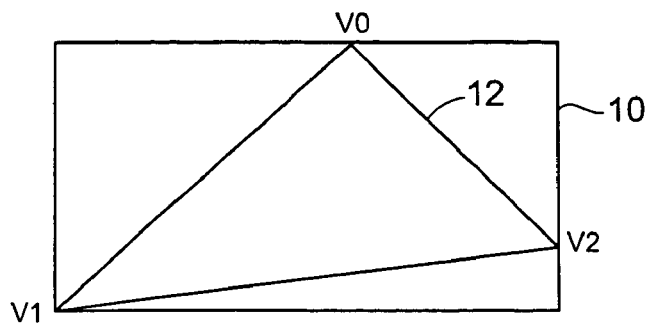
FIG. 1 is a standard bounding box that encloses a triangle.

FIG. 1 is a standard bounding box 10 that encloses a triangle 12. The bounding box is initially set to minimally enclose the entire triangle or other graphics primitive. The upper left corner has the coordinates (xmin, ymin) and the bottom right corner has the coordinates (xmax, ymax) and the vertices of the triangle are V0, V1 and V2 as shown.

Figure 2:
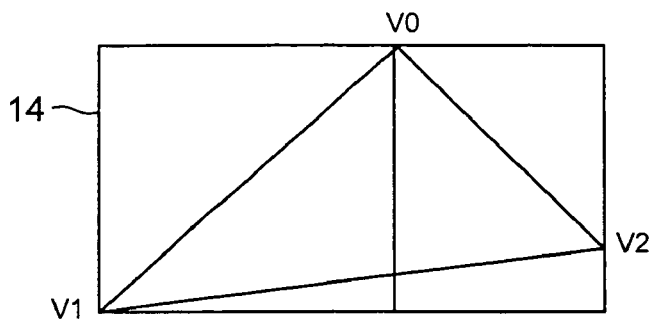
FIG. 2 shows an initial bounding box with vertex 2 outside of the Znear clipping plane.

FIG. 2 shows an initial bounding box 14 with vertex 2 (V2) outside of the Znear clipping plane. The bounding box 14 is formed using the vertices, V0 and V1, which do not lie outside of the Znear clipping plane.

Figure 3:
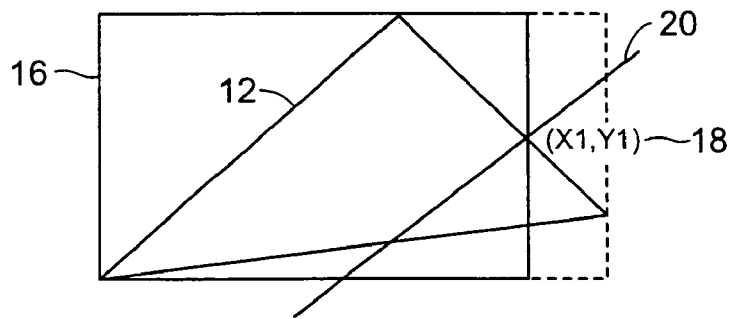
FIG. 3 shows a bounding box with a first new (x1, y1) clipping vertex.

FIG. 3 shows a bounding box 16 with a first new (x1, y1) clipping vertex 18. In this figure, the Znear clipping plane has an edge 20 that intersects the graphics primitive 12 at coordinates (x1, y1) 18. The bounding box 16 is increased to include the intersection point 18.

Figure 4:
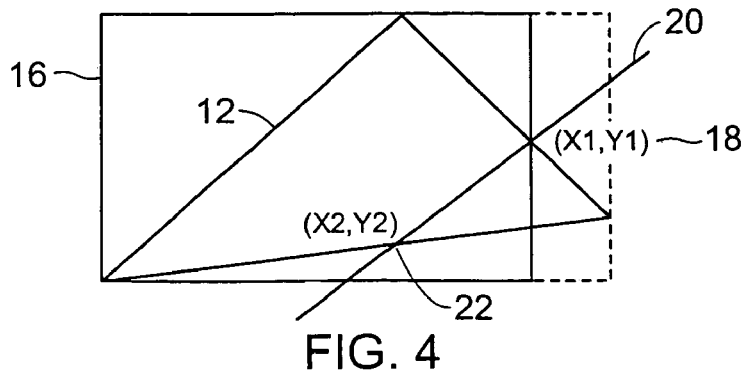
FIG. 4 shows a bounding box with a second new (x2, y2) clipping vertex.

FIG. 4 shows the bounding box 16 with a second new (x2, y2) clipping vertex 22. This figure illustrates that even if the Znear plane 20 intersects the graphics primitive 12 in two places 18, 22, the bounding box 16 is expanded to the intersection point 18 nearest the excluded vertex, V2.

Figure 5A:
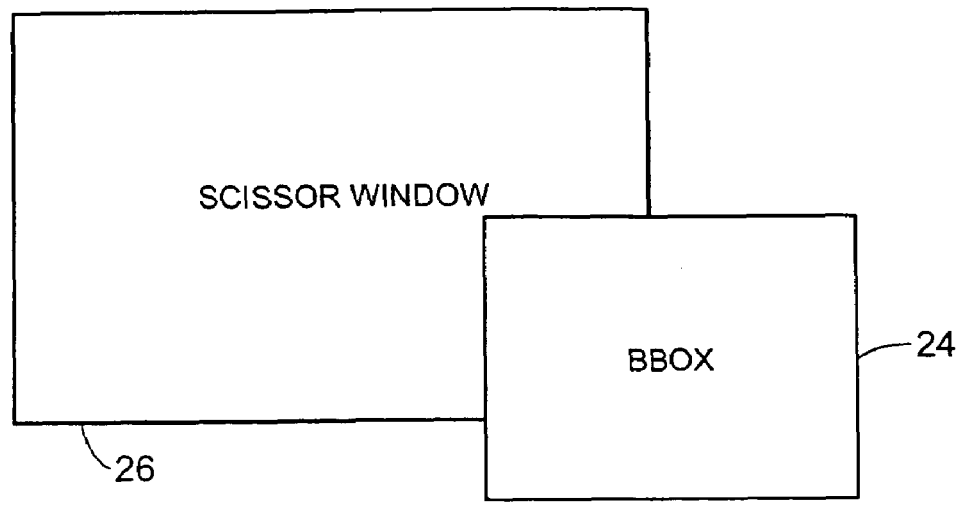
FIG. 5 shows an adjusted bounding box partially overlapping a scissor window.

FIG. 5A shows the overlap with a scissor window 26 after a final bounding box 24 is formed. Once the bounding box 24 is finalized, based on the clipping plane, the final bounding box is then subjected to a scissor window 26. If some part of the final bounding box lies outside the scissor window 26, the bounding box 24 is again reduced to that 28 shown in FIG. 5B, the goal being to have the smallest bounding box possible. This prevents parts of primitives from being rendered that are not visible in the final 2-D display space image, thereby avoiding unnecessary graphics engine work and improving performance.

Figure 5B:
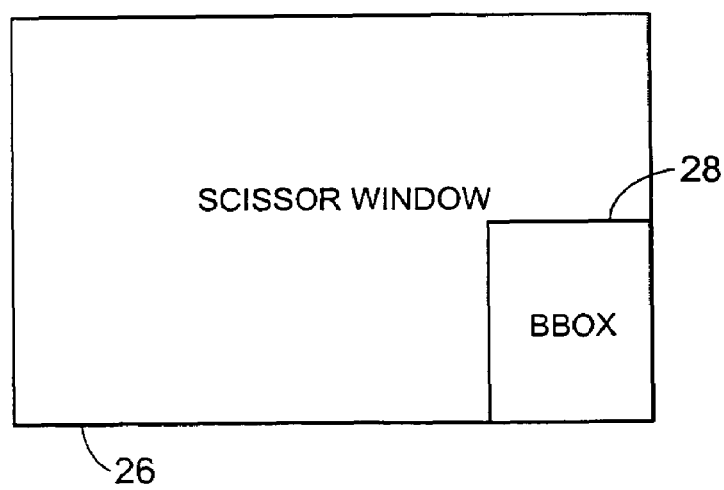
Figure 6:
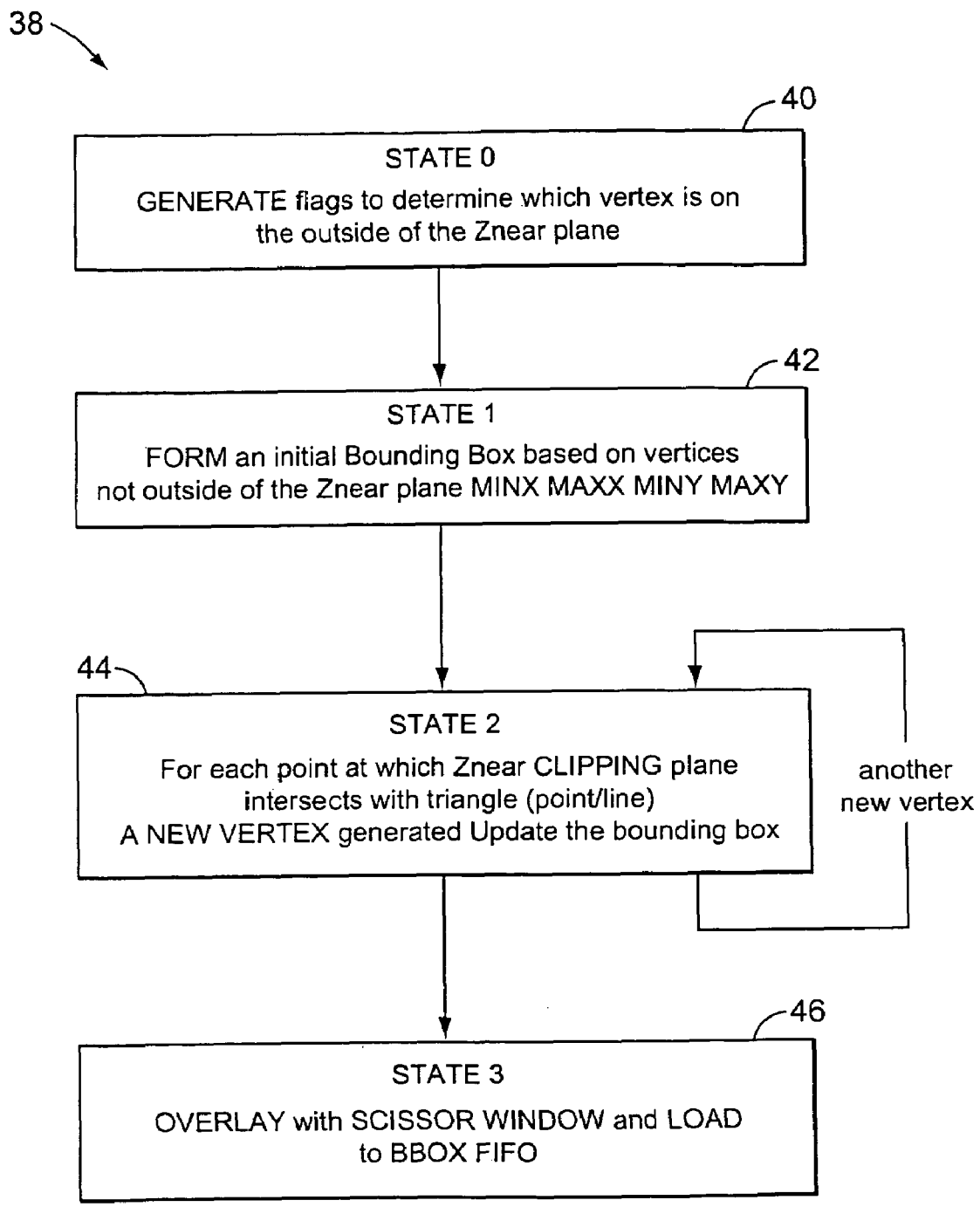
FIG. 6 shows a state diagram for the various hardware states.

FIG. 6 shows a state diagram 38 for the various hardware states. A first state 40, state 0, in the state diagram is a state for generating flags to indicate which vertex is outside of the Znear plane. In FIG. 2, V2 is outside of the Znear plane. In state 1 42, the initial bounding box is formed based on those vertices that are not outside of the Znear plane, as shown in FIG. 2. If only one vertex is not outside of the Znear plane, the bounding box is a point. Such bounding boxes will not be rendered because there is no primitive within the box to render. The initial bounding box is then loaded, in state 1, into the MINX, MAXX, MINY and MAXY registers. Next, in state 2 44, new vertices are identified where a clipping edge of the Znear plane intersects the graphics primitive and adjustments are made to the bounding box. The bounding box is adjusted to the intersection point nearest the excluded vertex. In state 3 46, the adjusted bounding box is overlaid with a scissor window and the resulting bounding box, as shown in FIG. 5B, is loaded into a FIFO.

Figure 7:
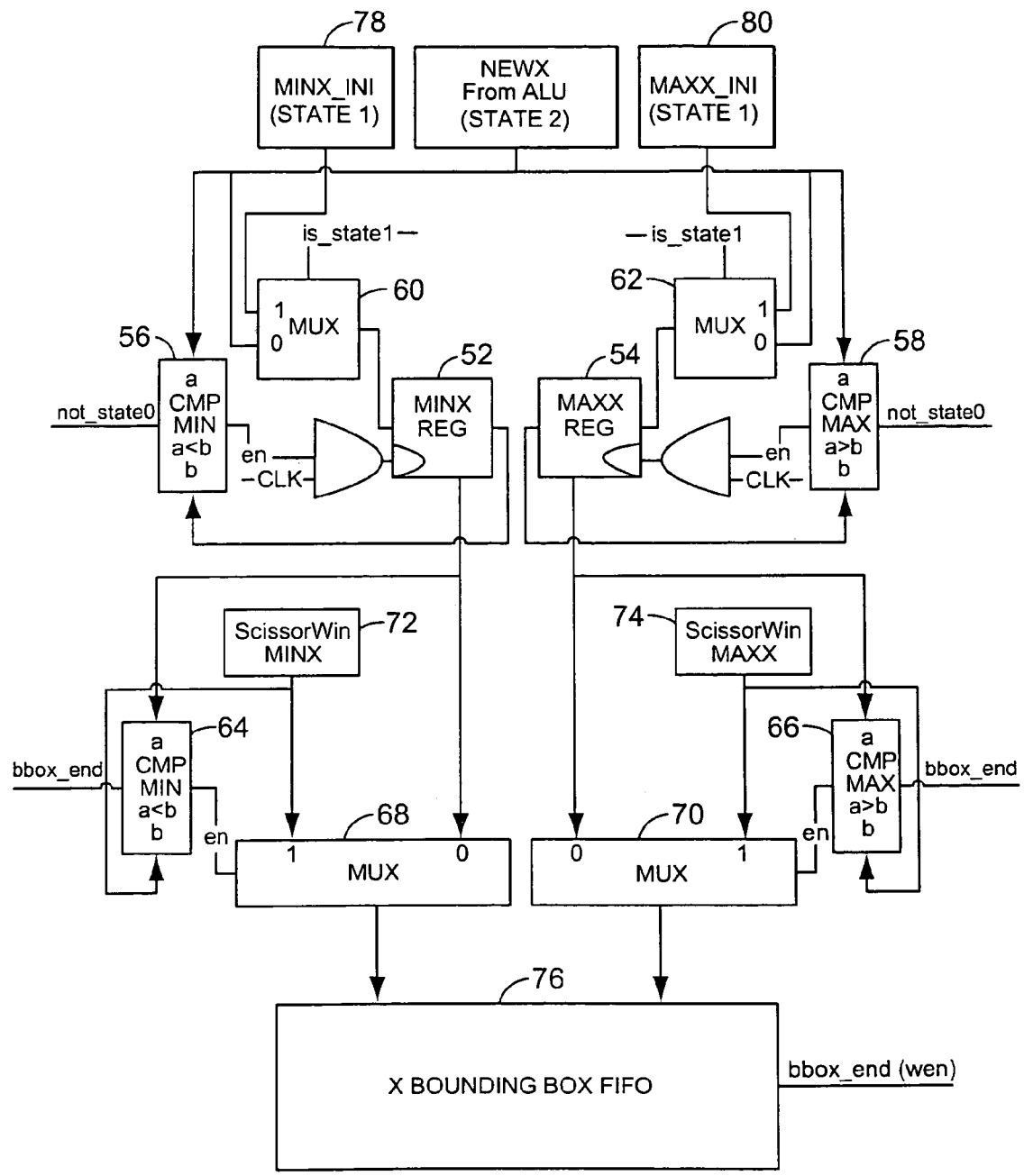
FIG. 7 shows a block diagram for the x-coordinate processing circuitry.

FIG. 7 shows a block diagram for the x-coordinate processing circuitry. The system 50 depicted shows a MINX register 52 and a MAXX register 54, a MINX_INI register 78, a MAXX_INI register 80, a MINX comparator 56 and a MAXX comparator 58, a multiplexer 60 for providing input to the MINX register 52, and a multiplexer 62 for providing input to the MAXX register 54. Also part of the system is the scissoring logic, which includes a MIN comparator 64 and MAX comparator 66, a MIN multiplexer 68 and MAX multiplexer 70, a ScissorWin MINX register 72 and a ScissorWin MAXX register 74. The results of the scissoring are fed to an X FIFO 76.

The system of FIG. 7 operates as follows. During state 1, the MINX multiplexer 60 and MAXX multiplexer 62 are set to pass the MINX_INI and MAXX_INI information to their respective registers, the MINX register 52 and the MAXX register 54. Next, in state 2, the NEWX information derived from the Znear clipping plane (from the ALU) is compared, via comparators 56, 58 with the information loaded in the registers. If the NEWX is smaller than the MINX, then the NEWX is entered into the register 52 on the clock, otherwise, the register 52 is not updated. Also, if the NEWX is larger than MAXX, then the MAXX register 54 is updated, otherwise, the register 54 is not updated. In the case shown in FIGS. 2 and 3, the NEWX is larger than MAXX_INI, so the MAXX register is updated with the NEWX, i.e., coordinate X1 in the figure. FIG. 4 shows that this may be a two step process, when the Znear clipping plane intersects the primitive at two points. In that case, the MAXX register 54 is first updated with X2, and then updated with X1. In state 3, the results in the MINX register 52 and MAXX register 54 are compared, respectively, with the ScissorWin MINX register 72 and ScissorWin MAXX register 74 values. If the MINX value is smaller than the ScissorWin MINX value, then the MUX is enabled to pass, via multiplexer 68, the ScissorWin MINX value onto the X bounding box FIFO 76. Otherwise, the MINX register value is passed to the X bounding box FIFO 76. If the MAXX value is larger than ScissorWin MAXX, then the ScissorWin MAXX is passed, via multiplexer 70, to the X bounding box FIFO 76, which is the case in FIGS. 5A and 5B. Otherwise, the MAXX register is passed.

Figure 8:
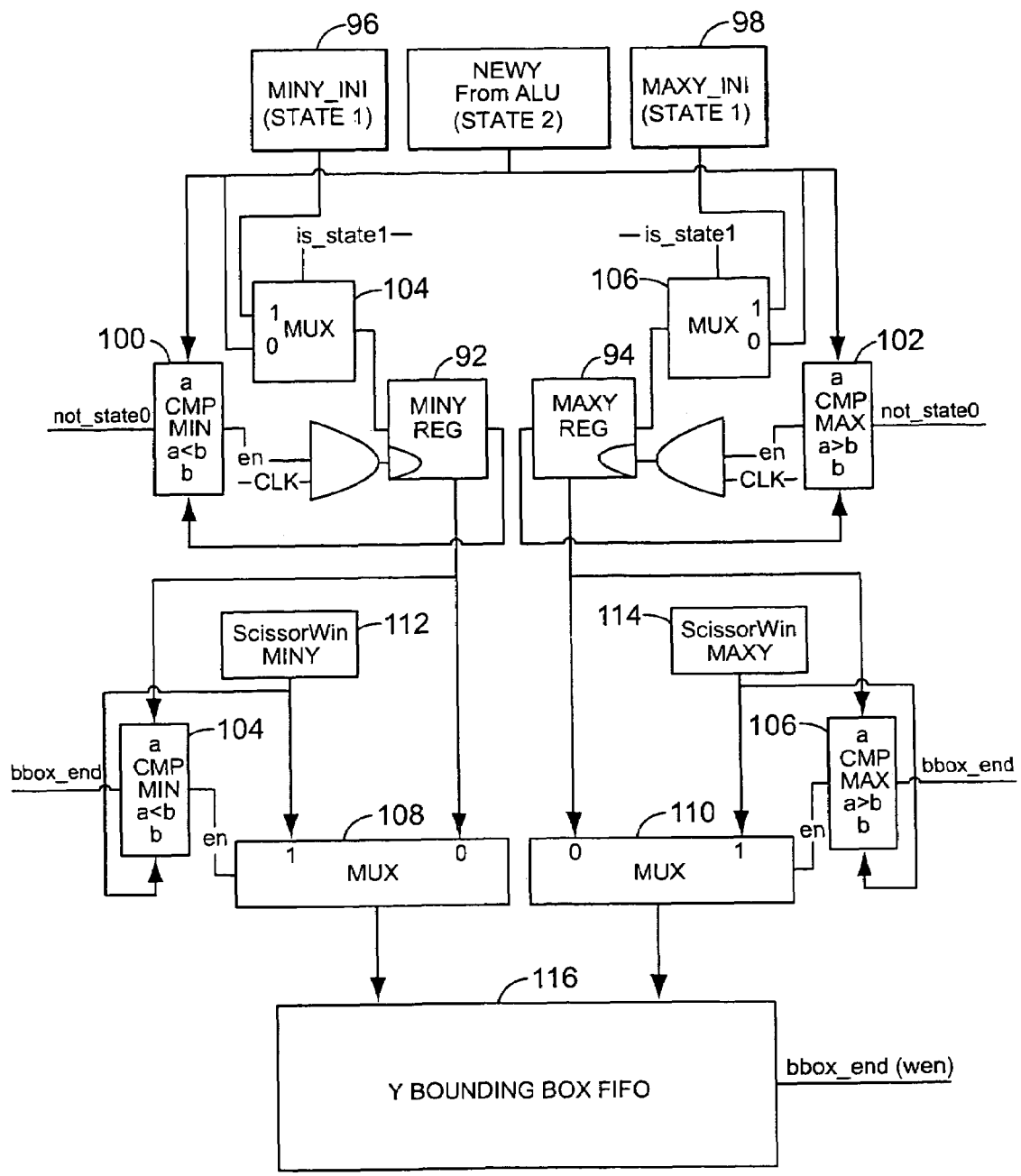
FIG. 8 shows a block diagram for the y-coordinate processing circuitry.

FIG. 8 shows a block diagram for the y-coordinate processing circuitry 90. The system depicted shows a MINY register 92 and a MAXY register 94, a MINY_INI register 96, a MAXY_INI register 98, a MINY comparator 100 and a MAXY comparator 102, a multiplexer 104 for providing input to the MINY register 92, and a multiplexer 106 for providing input to the MAXY register 94. Also part of the system is the scissoring logic, which includes a MIN comparator 118 and MAX comparator 120, MIN multiplexer 108 and MAX multiplexer 110, a ScissorWin MINY register 112 and a ScissorWin MAXY register 114. The results of the scissoring are fed to a Y FIFO 116. The system of FIG. 8 operates in a similar fashion as provided above with reference to the block diagram of FIG. 7 but for the y-coordinate of the top and bottom of the bounding box, the results of the comparisons being forwarded to the Y bounding box FIFO 116.

Thus, the x and y coordinate processing circuitry operates to provide the smallest possible bounding box based on the Znear plane as the clipping plane and to further adjust the bounding box x and y-coordinates by means of a scissoring window. This causes the smallest possible portion of the graphics primitive to be rendered, thus preserving the resources of the graphics hardware and improving performance.

Figure 9A:
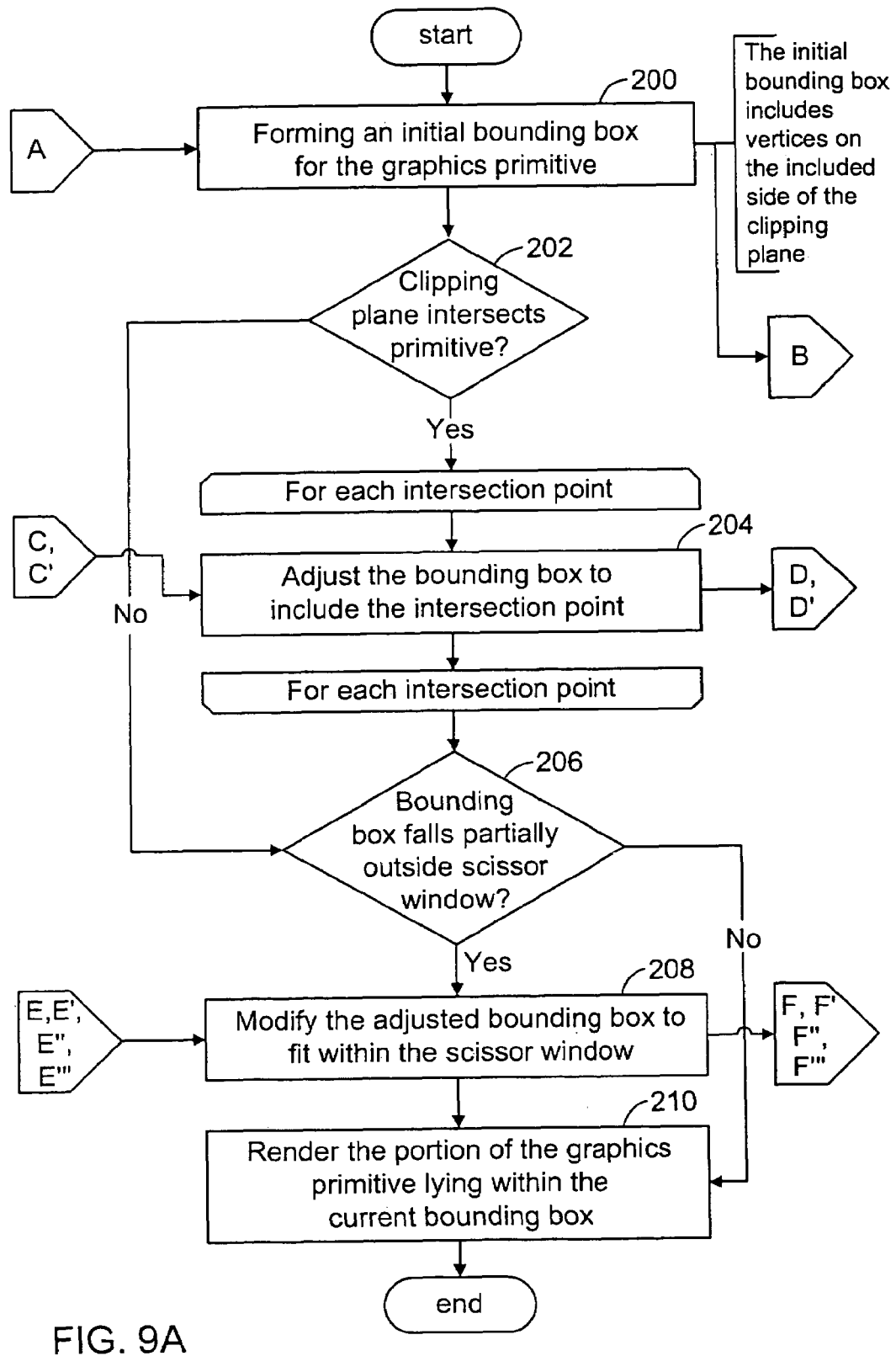
FIGS. 9A–9E show a flow chart of the steps in accordance with the present invention.

FIGS. 9A–9E show a flow chart of the steps in accordance with the present invention. Referring to FIG. 9A, in step 200, an initial bounding box is formed to enclose only the vertices of a graphics primitive that are on the included side of the clipping plane. Next, if the clipping plane edge intersects the graphics primitive, as determined in step 202, the bounding box is adjusted, in step 204, to include the intersection point. If the clipping plane edge intersects the graphics primitive at multiple points, the bounding box is adjusted to include all of the intersection points. Next, if the currently adjusted bounding box falls partially outside of the scissor window, as determined in step 206, then the current bounding box is adjusted, in step 208, to be within the bounds of the scissor window. Finally, in step 210, the portion of the graphics primitive within the current bounding box is rendered.

Figure 9B:
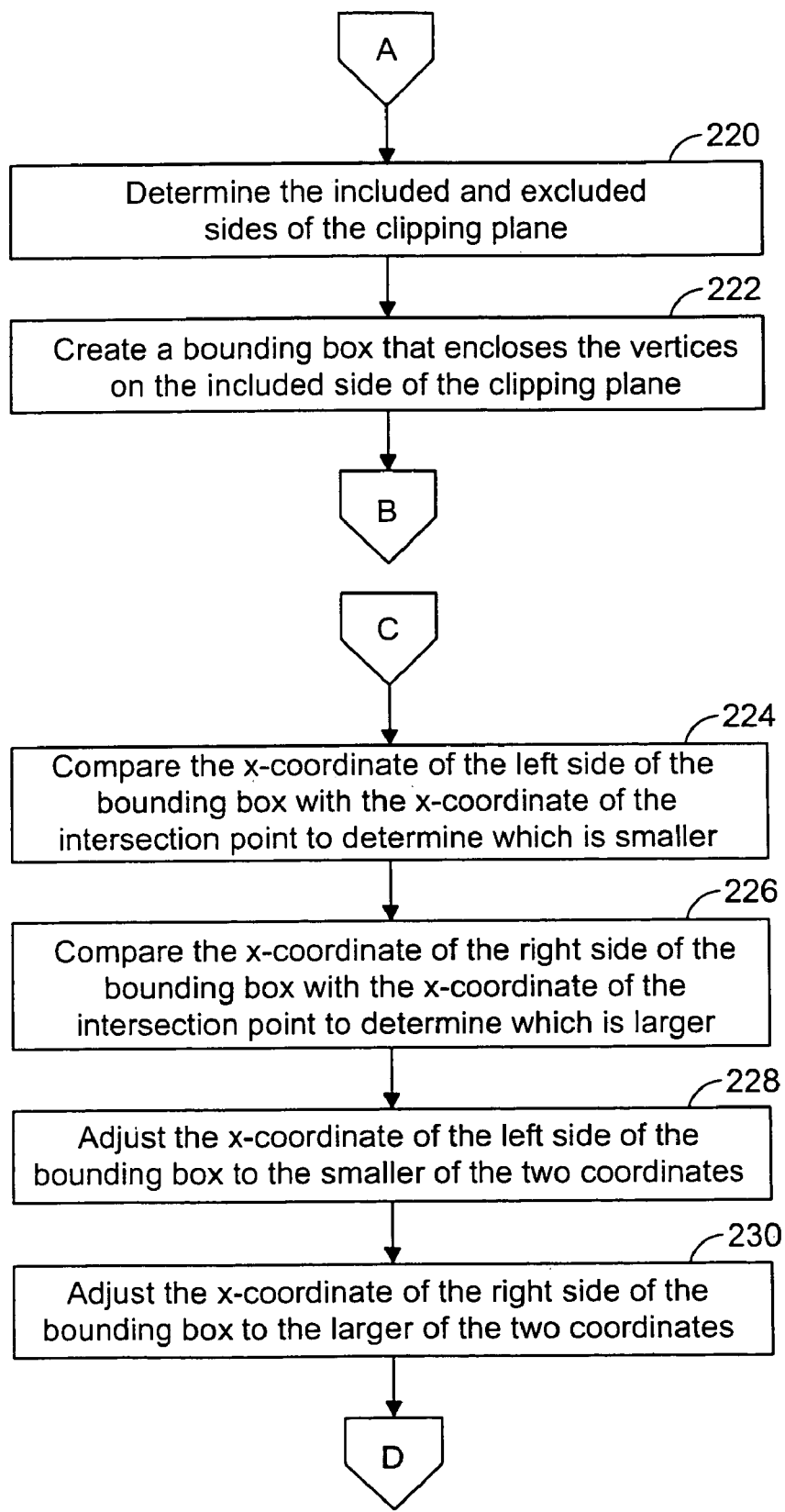

FIG. 9B shows the steps included in step 200. In step 220, the included and excluded sides of the clipping plane are determined and, in step 222, a bounding box is created that encloses the vertices on the included side of the clipping plane.

FIG. 9B also shows the steps included in step 204 for the x-coordinate. In step 224, the x-coordinate of the left side of the bounding box is compared with the x-coordinate of the intersection point to determine which is smaller. In step 226, the x-coordinate of the right side of the bounding box is compared with the x-coordinate of the intersection point to determine which is larger. In step 228, the x-coordinate of the left side of the bounding box is adjusted, if needed, to the smaller of the two coordinates, and in step 230, the right side of the bounding box is adjusted, if needed, to the larger of the two coordinates.

Figure 9C:
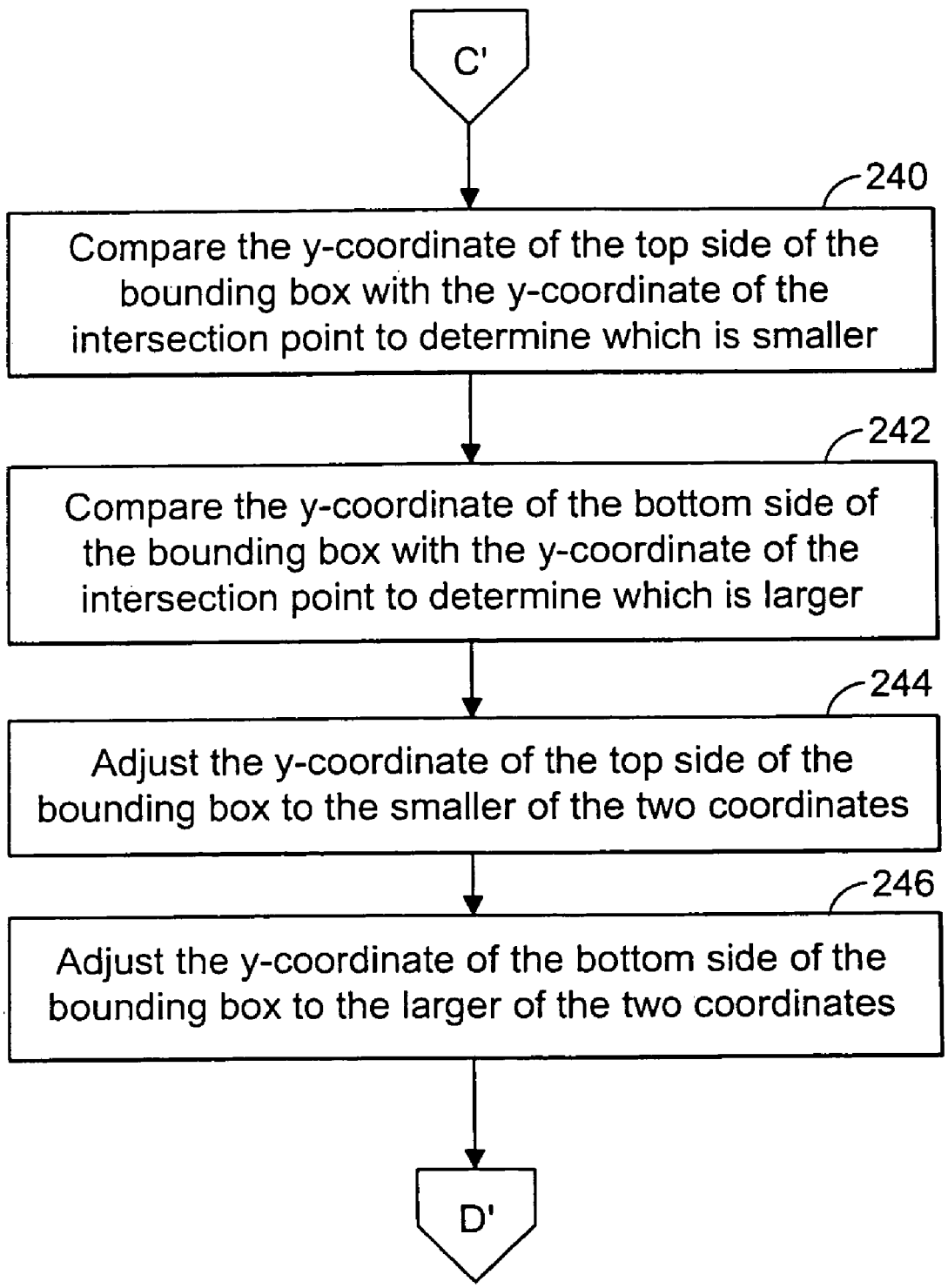

FIG. 9C shows the steps included in step 204, for the y-coordinate. In step 240, the y-coordinate of the top-side of the bounding box is compared with the y-coordinate of the intersection point to determine which is smaller. In step 242, the y-coordinate of the bottom side of the bounding box is compared with the y-coordinate of the intersection point to determine which is larger. In step 244, the y-coordinate of the top side of the bounding box is adjusted to the smaller of the two coordinates and in step 246, the y-coordinate of the bottom side of the bounding box is adjusted to the larger of the two coordinates.

Figure 9D:
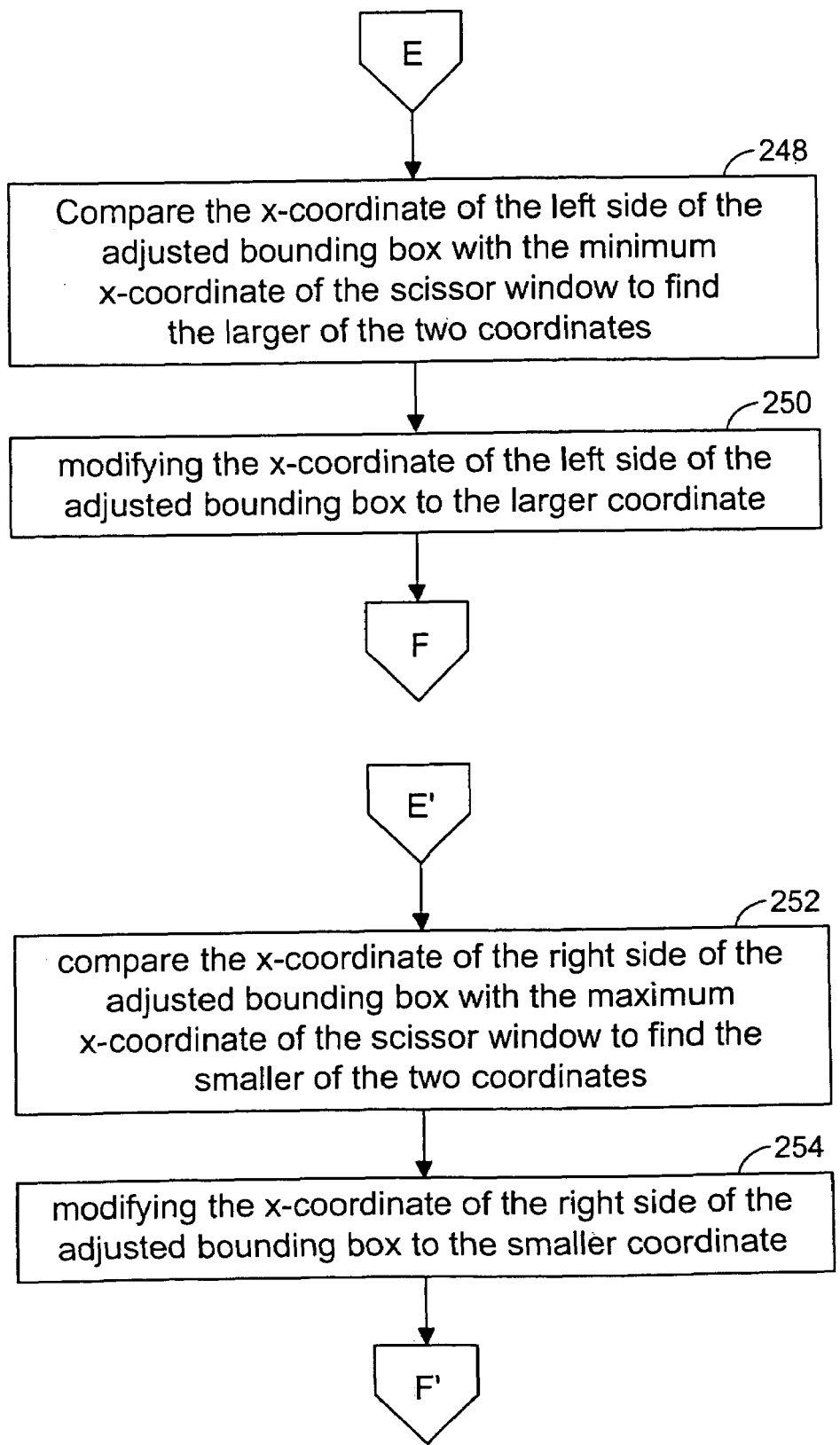

FIG. 9D shows the steps included in step 208 for the x-coordinate. In step 248, the x-coordinate of the left side of the adjusted bounding box is compared with the minimum x-coordinate of the scissor window to find the larger of the two coordinates. In step 250, the x-coordinate of the left side of the bounding box is adjusted to the larger coordinate. Also, in step 252, the x-coordinate of the right side of the bounding box is compared with the maximum x-coordinate of the scissor window to find the smaller of the two coordinates. In step, in step 254, the x-coordinate of the right side of the bounding box is adjusted to the smaller coordinate.

Figure 9E:
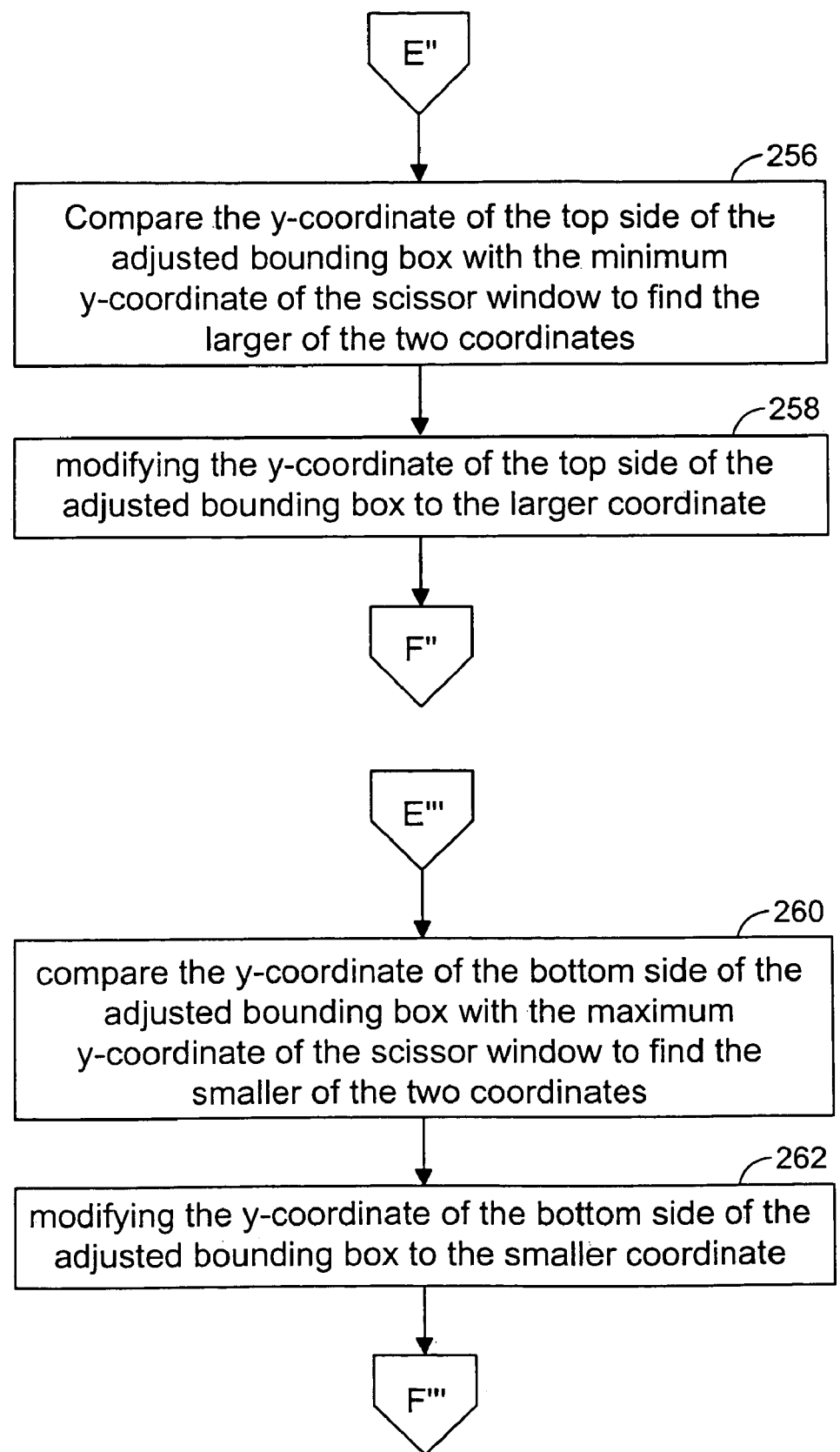

FIG. 9E shows the steps included in step 208 for the y-coordinate. In step 256, the y-coordinate of the top side of the bounding box is compared with the minimum y-coordinate of the scissor window to find the larger of the two coordinates, and in step 258, the y-coordinate is adjusted to the larger of the two coordinates. In step 260, the y-coordinate of the bottom side of the bounding box is compared with the maximum y-coordinate of the scissor window to find the smaller of the two coordinates, and in step 262, the y-coordinate is adjusted to the smaller coordinate.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for processing a graphics primitive for display in a display space, said display space being defined by a scissor window, and the graphics primitive being part of an object in a view space including a clipping plane having an included and excluded side, the method comprising:
    forming an initial bounding box in the display space for the graphics primitive, wherein the display space includes an edge derived from the clipping plane in the view space and the initial bounding box includes only those vertices on the included side of the clipping plane;
    determining whether or not the clipping plane intersects the graphics primitive, and if so, adjusting the bounding box to include the intersection point;
    ascertaining whether or not the adjusted bounding box falls partially outside of the scissor window, and if so, modifying the adjusted bounding box based on the edges of the scissor window so that one or more edges of the modified bounding box are coincident with the edges of the scissor window and any remaining edges of the modified bounding box lie within the scissor window;
    rendering the portion of the graphics primitive within the modified bounding box; and
    displaying the portion of the graphics primitive on a screen.

2. A method for processing a graphics primitive as recited in claim 1,
    wherein the initial bounding box has an x-coordinate for a left side and an x-coordinate for a right side and there is an intersection vertex with x and y-coordinates at which the graphics primitive intersects the edge of the clipping plane; and wherein the steps of determining and adjusting the bounding box include:
        comparing the x-coordinate of the left side of the bounding box with the x-coordinate of the intersection vertex to determine which coordinate is smaller;
        comparing the x-coordinate of the right side of the bounding box with the x-coordinate of the intersection vertex to determine which coordinate is larger; and
        adjusting the x-coordinate of the left side to the smaller of the two coordinates or the x-coordinate of the right side to the larger of the two coordinates.

3. A method for processing a graphics primitive as recited in claim 1,
    wherein the initial bounding box has an y-coordinate for a top side and an y-coordinate for a bottom side and there is a vertex with x and y-coordinates at which the graphics primitive intersects the edge of the clipping plane; and
    wherein the steps of determining and adjusting the bounding box include:
        comparing the y-coordinate of the top side of the bounding box with the y-coordinate of the intersection vertex to determine which coordinate is smaller;
        comparing the y-coordinate of the bottom side of the bounding box with the y-coordinate of the intersection vertex to determine which coordinate is larger; and
        adjusting the y-coordinate of the top side to the smaller of the two coordinates or the y-coordinate of the bottom side to the larger of the two coordinates or the y-coordinate of the bottom side to the larger of the two coordinates.

4. A method for processing a graphics primitive as recited in claim 1,
    wherein the adjusted bounding box has an x-coordinate for a left side and an x-coordinate for a right side;
    wherein the scissor window has a minimum and maximum x-coordinate; and
    wherein the steps of ascertaining and modifying the adjusted bounding box include:
        comparing the x-coordinate of the left side of the adjusted bounding box with the minimum x-coordinate of the scissor window to find the larger of the two coordinates; and
        modifying the x-coordinate of the first side of the adjusted bounding box to the larger coordinate.

5. A method for processing a graphics primitive as recited in claim 1,
    wherein the adjusted bounding box has an x-coordinate for a left side and an x-coordinate for a right side;
    wherein the scissor window has a minimum and maximum x-coordinate; and
    wherein the steps of ascertaining and modifying the adjusted bounding box include:
        comparing the x-coordinate of the right side of the adjusted bounding box with the maximum x-coordinate of the scissor window to find the smaller of the two coordinates; and
        modifying the x-coordinate of the right side of the adjusted bounding box to the smaller coordinate.

6. An apparatus for processing a graphics primitive for display in a display space, said display space being defined by a scissor window, and the graphics primitive being part of an object in a view space including one or more clipping planes and having an initial bounding box in the display space with the left and right x-coordinates and top and bottom y-coordinates, the apparatus comprising:

x-clipping logic having an input for receiving the left x-coordinate and an input for receiving the right x-coordinate of the initial bounding box, the x-clipping logic operative to adjust, when the clipping plane intersects the graphics primitive, the x-coordinates of the initial bounding box to include x-coordinates of all intersection points of the primitive and the clipping plane;

y-clipping logic having an input for receiving the top y-coordinate and an input for receiving the bottom y-coordinate of the initial bounding box, the y-clipping logic operative to adjust, when the clipping plane intersects the graphics primitive, the y-coordinates of the initial bounding box to include y-coordinates of all intersection points of the primitive and the clipping plane;

x-window scissor logic coupled to the x-clipping logic to receive the adjusted x-coordinates of the bounding box, the x-window scissor logic for modifying the x-coordinates of the adjusted bounding box upon receiving the adjusted x-coordinates of the bounding box;

y-window scissor logic coupled to the y-clipping logic to receive the adjusted y-coordinates of the bounding box, the y-window scissor logic for modifying the y-coordinates of the adjusted bounding box upon receiving the adjusted y-coordinates of the bounding box;

logic for rendering only the portion of the graphics primitive within the adjusted bounding box; and displaying the portion of the graphics primitive on a screen.

7. An apparatus for processing a graphics primitive as recited in claim 6, wherein the x-clipping logic and the y-clipping logic each include:

a multiplexer, responsive to a first state signal, for selecting an initial bounding box coordinate or an intersection vertex coordinate;

a register for storing the coordinate selected by the multiplexer upon a transition of a clock signal when an enable signal is active; and a comparator, responsive to a second state signal, for comparing a first coordinate with a second coordinate and providing the enable signal when the first coordinate is smaller than the second coordinate, wherein the first coordinate is an intersection vertex coordinate and the second coordinate is the register output.

8. An apparatus for processing a graphics primitive as recited in claim 6, wherein the x-clipping logic and the y-clipping logic each includes:

a multiplexer, responsive to a first state signal, for selecting an initial bounding box coordinate or an intersection vertex coordinate;

a register for storing the coordinate selected by the multiplexer upon a transition of a clock signal when an enable signal is active; and a comparator, responsive to a second state signal, for comparing a first coordinate with a second coordinate and providing the enable signal when the first coordinate is larger than the second coordinate, wherein the first coordinate is an intersection vertex coordinate and the second coordinate is the register output.

9. An apparatus for processing a graphics primitive as recited in claim 6, wherein the x-window scissor logic coupled with the x-clipping logic and the y-window scissor logic coupled with the y-clipping logic each includes:

a multiplexer, responsive to a select input, for selecting a stored adjusted coordinate or a scissor window coordinate;

a register for storing the scissor window coordinate; and a comparator, responsive to an enable signal, for comparing the stored adjusted coordinate and the scissor window coordinate and providing an output connected to the select input indicating which coordinate is smaller.

10. An apparatus for processing a graphics primitive as recited in claim 6, wherein the x-window scissor logic coupled with the x-clipping logic and the y-window scissor logic coupled with the y-clipping logic each includes:

a multiplexer, responsive to a select input, for selecting a stored adjusted coordinate or a scissor window coordinate;

a register for storing the scissor window coordinate; and a comparator, responsive to an enable signal, for comparing the stored adjusted coordinate and the scissor window coordinate and providing an output connected to the select input indicating which coordinate is larger.

* * * * *